July 25, 1933. E. S. BUCK 1,919,413
AUTOMATIC VALVE
Original Filed Aug. 20, 1928  2 Sheets-Sheet 1
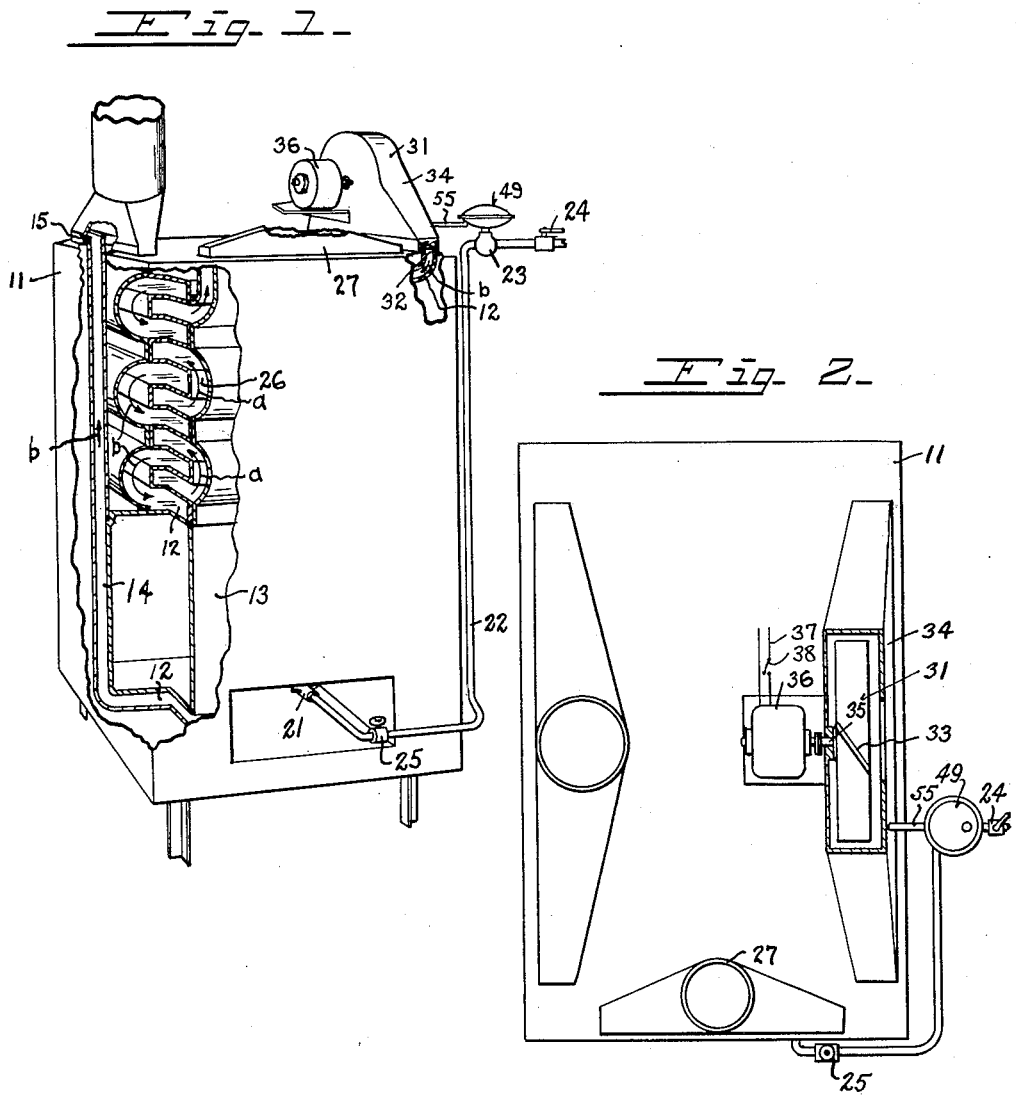
INVENTOR:
Everett S. Buck, July 25, 1933.  E. S. BUCK  1,919,413
AUTOMATIC VALVE
Original Filed Aug. 20, 1928  2 Sheets-Sheet 2
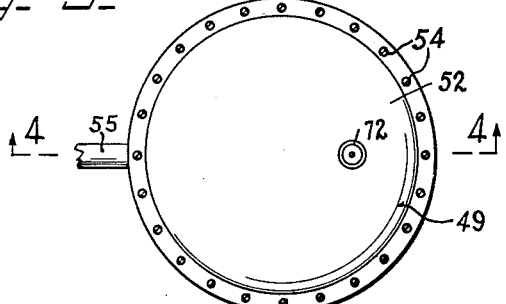
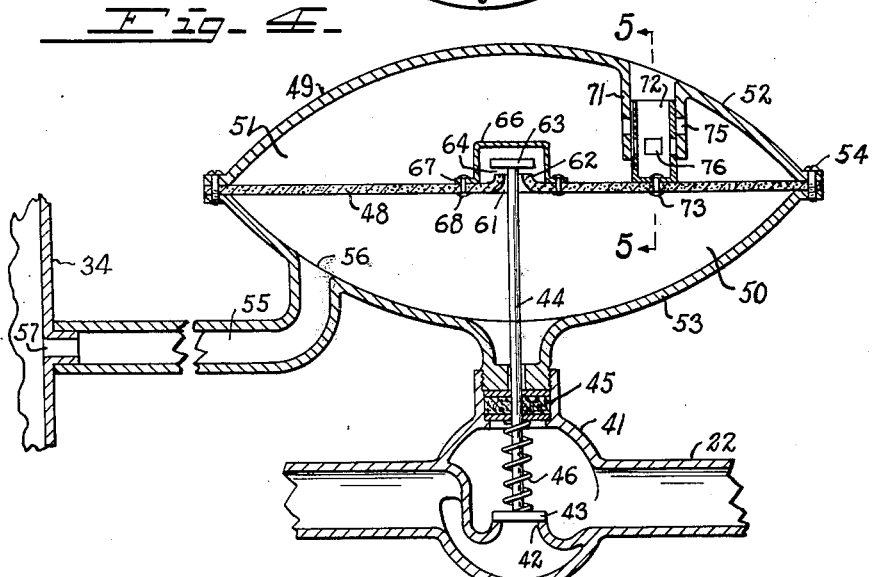
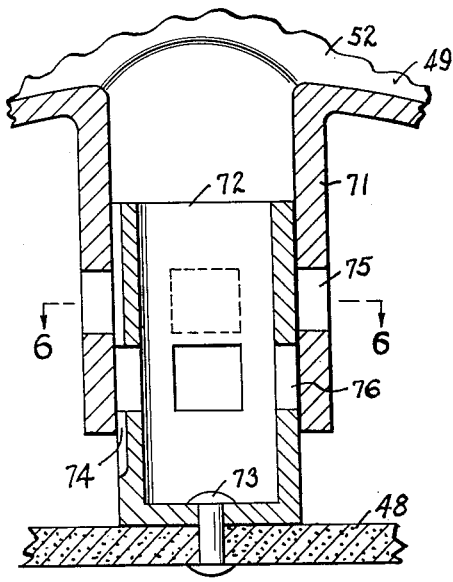
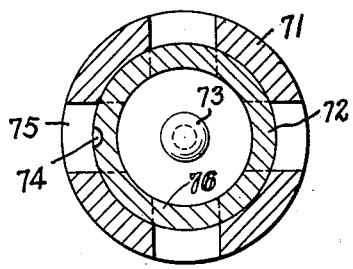
INVENTOR:
Everett S. Buck.

Patented July 25, 1933

1,919,413

UNITED STATES PATENT OFFICE

EVERETT S. BUCK, OF CINCINNATI, OHIO, ASSIGNOR, BY MESNE ASSIGNMENTS, TO THE EDWARDS MANUFACTURING COMPANY, OF CINCINNATI, OHIO, A CORPORATION OF OHIO

AUTOMATIC VALVE

Application filed August 20, 1928, Serial No. 300,895. Renewed May 7, 1930.

It is the object of the invention to provide a new and improved automatic valve. In the present exemplification it is shown in such relation that the supply of fuel in a heating furnace is automatically stopped upon cessation of the flow of the heating medium. The invention is applicable primarily in furnaces in which the heating medium, that is to say, the medium to be heated, whether prior to being heated, during the heating, or during the passage thereof to the points of utilization of the heating, is under pressure. The term furnace includes any heating unit regardless of its size and whether intended for heating a room, a number of rooms, or for other service, and the term heating medium defines the medium employed for heating such room or rooms, or other space.

The invention is exemplified in connection with a furnace of the character of that shown, described and claimed in the copending application of Arthur E. Reuss for patent on Improvements in air heaters, Serial No. 223,666, filed in the United States Patent Office October 3, 1927. No claim is herein made to such furnace, the same being shown, described and claimed in said copending application. Said copending application was issued May 28, 1929, as Patent No. 1,715,007.

The heating medium is instanced as air under pressure induced by a suitable fan or blower operated by an electric motor.

It has been found desirable that the application of heat shall cease if for any reason the pressure of the heating medium shall cease or be materially reduced, in order to prevent the delivery of burned gases by the heating unit, and to prevent injury to the furnace.

It is the object of the invention therefore further to provide novel means for automatically interrupting the heating or supply of fuel upon material reduction in pressure of the heating medium; further, to provide novel means whereby the pressure of the heating medium controls the heat or supply of fuel; further, to provide novel means for normally automatically closing the heat control valve, and for automatically opening the heat control valve by pressure of the heating medium; further, to provide novel means for automatically maintaining the heat control valve in open relation during maintenance of pressure on the heating medium.

It is the object of the invention, further, to provide novel means for causing initial movement in the control means for the heat control valve prior to opening of said valve for causing heat or supplying fuel, and for automatically opening said valve and maintaining the same in open relation during continuance of pressure on the heating medium; and, further, to provide pressure exerting means for exerting pressure upon the heating medium and a movable member controlled by said pressure exerting means having operative connection with the heat control valve for maintaining open relation in said heat control valve solely during operation of said pressure exerting means.

The invention will be further readily understood from the following description and claims, and from the drawings, in which latter:

Fig. 1 is a perspective view of a heating furnace embodying the present invention, parts being broken away and other parts being shown in section for better illustration.

Fig. 2 is a plan view of the same.

Fig. 3 is a plan view of an exemplifying control means for the fuel supply valve showing its operative connections partly broken away.

Fig. 4 is an axial section of the same, taken on the line 4—4 of Fig. 3, and showing its connection with the heating furnace, partly broken away.

Fig. 5 is an enlarged section of a detail of the same, taken in the plane of the line 5—5 of Fig. 4; and, Fig. 6 is a cross-section of the same, taken in the plane of the line 6—6 of Fig. 5.

In the exemplifying furnace 1 there is a passage 12 for the heating medium, instanced as air, which passage extends back and forth in connected channels in the body of the furnace and about the fire-box 13 therein, an upwardly extending portion 14 thereof being provided with a discharge mouth 15 for discharging the heating medium either directly or through a suitable pipe or pipes to the point or points of desired application of the heat.

A heating element 21 is located in the firebox. This heating element is exemplified as a gas burner, although it will be understood that the heating element may be of other form, and that fuel other than gas, whether fluid or solid, may be employed. The burner is supplied from a pipe 22 in which there is an automatic valve 23. A manual shut-off valve 24, and a regulating valve 25 may also be in the pipe.

The products of combustion from the burner pass through the furnace and are exemplified as passing along connected channels 26 located between the channels 12 of the heating medium and as extending back and forth between the channels of the heating medium. (See arrows $a$.) The products of combustion are discharged into a suitable pipe 27 connecting with a suitable chimney or stack. The channels for the products of combustion and for the heating medium are separated from each other throughout their lengths so as to prevent intermingling of the products of combustion and the heating medium. The channels for the products of combustion and for the heating medium are exemplified as proximate to each other, extending next to each other throughout the heat transference from the former to the latter. This is more fully described in the aforesaid patent. Heat of the products of combustion passes through the walls between the channels 26 and 12, the products of combustion in the channels 26 heating the heating medium in the channels 12 by indirect heating.

A fan 31 operates through the mouth 32 of the channel 12 for the heating medium. This fan is in the form of a blower, and is provided with blades 33 in a casing 34. The fan is on a shaft 35 suitably journaled in bearings in the casing. An electric motor 36 has the rotor thereof suitably connected with the shaft for operating the fan. The electric motor may receive its power from an ordinary house line, in the conductors 37 of which a suitable manual switch 38 may be located for controlling the operation of the electric motor.

A forced draft is imparted to the heating medium, which in the exemplification stated is in a direction reverse to the normal flow of a heating medium being heated, being exemplified as in a general direction downwardly, (see arrows $b$), in the furnace toward the fire-box 13. Pressure is exerted upon the heating medium by the blower.

As the heating medium passes along the walls of the furnace heated by the burner and the products of combustion, heat is transferred from the latter to the former, and the passage of the heating medium along such heated surfaces prevents injury to such surfaces due to the heat. Should it happen, however, that the flow of the heating medium should substantially cease, injury might result, for instance, by burning the heating medium which may be in the furnace, or by burning or warping of the parts subjected to the heat. It is the object of the invention to avoid such objections.

Automatic control means are provided for automatically controlling the combustion or heat or for shutting off the fuel supply, such automatic control means being controlled by the pressure of the heating medium.

The automatic valve 23 exemplified comprises a casing 41 in which there is a valve-seat 42. A valve 43 coacts with said seat. The valve has a stem 44. The stem extends through packings 45 for preventing the passage of fuel past the valve casing 41. A spring 46 received about the valve-stem causes normal seating of the valve 43.

A movable member 48, exemplified as the diaphragm, is in a shell 49. The shell comprises a pressure chamber 50 and a compression chamber 51 at the respective sides of the diaphragm. The structure is exemplified as formed by shell parts 52, 53, provided with marginal flanges between which the diaphragm is clamped, as by screws 54, for making air-tight joints.

A passage 55 communicates with the chamber 50 through a port 56. The pressure in this passage and in the chamber 50 is caused by the pressure exerting means, exemplified as the electric motor 36 and the blower 31. Specifically, the passage 55 communicates with a port 57 in the passage leading from the blower. This port may be at any suitable point in the passage for the heating medium, or at any point for receiving pressure from the blower or the motor. The pressure in the pressure passage is present so long as the pressure exerting means are operating.

The valve-stem 44 is received through a hole 61 in the diaphragm, the wall of which hole may be up-turned and form a valve-seat 62, or shoulder. The valve-stem is provided with a flange 63, which may form a valve, cooperating with the shoulder 62. There is normally a space 64 between this seat or shoulder 62 and the valve or flange 63. A cup 66 is received about the end of the valve-stem and its flange and said shoulder, the margin 67 of the cup being fixed to the diaphragm, as by rivets 68, preferably to form an air-tight joint.

The diaphragm may be of leather or other suitable substance, and is arranged to be moved or deflected by pressure in the chamber 50. The diaphragm is normally flat, as shown in Fig. 4. Pressure in the chamber 50 causes bulging of the diaphragm out of its normal position, and causes compression in the chamber 51. The movement of the diaphragm or movable element is initially idle throughout the space 64, further movement of the same causing automatic raising of the valve 43 for permitting the flow of fuel through said valve. It is desirable that the movement of the valve shall be a quick movement, for instance, a snap movement.

In order to permit movement of the diaphragm by pressure in the pressure chamber 50 with an initial slow movement without too much resistance by compression in the compression chamber 51, a slight leakage is permitted out of said compression chamber, which is followed by quick release of compression in said compression chamber for permitting quick movement of the diaphragm, the diaphragm being maintained in such actuated condition as long as pressure is maintained by the pressure exerting means, or as long as there is pressure flow of the heating medium. The pressure exerted in the pressure chamber 50 is instanced as static pressure.

These last-named means may be exemplified as a cylinder 71 projecting from the wall 52 for instance into the chamber 51. A piston 72 is in the cylinder 71, and has connection with the diaphragm 48, as by being riveted thereto by a rivet 73. There is a small passage 74, or leak, between the piston and its cylinder, just sufficiently large to provide a leak out of the chamber 51 for initial retarded movement of the diaphragm 48. Such leak may be provided at any desired point in the wall of the chamber 51 not communicating with the chamber 50.

The cylinder 71 is provided with apertures 75, and the piston 72 is provided with apertures 76, which are normally out of registry. When movement of the diaphragm takes place due to pressure in the chamber 50, the apertures in the piston move toward the apertures in the cylinder, the apertures in the piston being spaced in axial direction from the apertures in the cylinder, so that said apertures will remain in non-registry so long as the initial restricted movement of the diaphragm takes place, that is, until the space 64 has been closed.

Registry between the apertures in the piston and the apertures in the cylinder then takes place for permitting pronounced relief of compression in the compression chamber 51, which is quickly accelerated by complete registry of the apertures in the piston with the apertures of the cylinder, for quick relief of said compression in the compression chamber 51, and quick or snap movement of the movable member or diaphragm, resulting in quick or snap opening of the fuel supply valve 43.

In closing off the current, for instance, by manipulation of the switch 38, or when for any other reason there has been an intentional or accidental failure in the compression in the chamber 50, as by failure of the electric motor to operate, or stoppage of said electric motor for any reason, there will be quick or snap return of the movable member or diaphragm 48 toward its normal position, shown in Fig. 4, and there is practically no resistance to such movement until the fuel supply valve has been seated, because the apertures 76 are in registry with the apertures 75.

The final portion of the movement of the diaphragm to normal position takes place after the fuel supply valve 43 has been seated. This final portion of the return movement of the diaphragm to normal position takes place slowly by reason of the fact that the chamber 51 is then substantially closed, thereby resisting further return to normal position of the diaphragm by reason of vacuum pressure in the chamber 51, relieved, however, by the restricted passage 74, which permits slow return movement of the diaphragm to normal position for again providing the spaced relation 64 between the flange 63 on the valve-stem and the shoulder 62 on the diaphragm.

The present invention insures a snap opening and also a snap closing of the fuel valve, and maintains the fuel valve in fully opened position during use to prevent fluttering of the fuel valve, and insures closing of the fuel valve upon failure of pressure in the heating medium.

Having thus fully described the invention, what is claimed as new, and desired to be secured by Letters Patent, is:

1. In an automatic valve, the combination of a valve member, a pressure chamber, a movable member controlled by the pressure in said pressure chamber, a compression chamber resisting movement of said movable member, said compression chamber being provided with a port, a closure for said port having operative connection with said movable member, said movable member having operative connection with said valve member, for positioning said movable member and said closure for opening said port and for maintaining open relation of said valve member during continuance of pressure in said pressure chamber.

2. In an automatic valve, the combination of a valve member, a pressure chamber, a movable member controlled by the pressure in said pressure chamber, a compression chamber resisting movement of said movable member, said compression chamber being provided with a port, a closure for said port having operative connection with said movable member, said movable member having spaced operative connection with said valve member for initial idle movement of said movable member and subsequent positioning of said movable member and said closure for opening said port and for maintaining open relation of said valve member during maintenance of pressure in said pressure chamber, and means for normally closing said valve member.

3. In an automatic valve, the combination of a valve member, a pressure chamber, a movable member controlled by the pressure in said pressure chamber and having operative connection with said valve member for operating said valve member, resisting means for said movable member resisting open relation of said valve member and comprising a resistance releasing element and a coacting element therefor, said resistance releasing element having operative connection with said movable member for quick movements of said valve member in opposite directions during release relation of said resistance releasing element, and arranged for closing said valve member upon cessation of pressure in said pressure chamber.

4. In an automatic valve, the combination of a valve member, a pressure chamber, a movable member controlled by the pressure in said pressure chamber and having operative connection with said valve member, opposing pressure exerting means exerting opposing pressure on said movable member, and a pressure release device for said opposing pressure exerting means, said pressure release device comprising a movable pressure release element and a coacting element, and said movable pressure release element having operative connection with said movable member for being moved thereby and movable in opposite directions with said movable member for respectively releasing pressure in said opposing pressure exerting means for open relation of said valve member and for speedy closing of said valve member upon cessation of pressure in said pressure chamber.

5. In an automatic valve, the combination of a valve member, a pressure chamber, a movable member at one side of said pressure chamber controlled by the pressure in said pressure chamber, said movable member having operative connection with said valve member, a compression chamber at the other side of said movable member, a relief port therefor, and a part normally closing said port, said last-named part having operative connection with said movable member, the pressure in said pressure chamber arranged for moving said movable member and said last-named part for relief of compression in said compression chamber and for maintaining said valve member in open relation during such actuated relation of said movable member, and arranged for automatic closing of said valve member upon retraction of said movable member.

6. In an automatic valve, the combination of a feed passage and a pressure passage, said passages being continuously separated, of a valve member in said feed passage, means movable in opposite directions and responsive to pressure in said pressure passage for controlling said valve member, resisting means for said pressure responsive means having a relief means including a control operatively connected to and movable in opposite directions with said pressure responsive means, said pressure responsive means being constructed and arranged for maintaining said valve in open position in response to predetermined pressure in said pressure passage, and means for normally closing said valve member.

EVERETT S. BUCK.